April 19, 1932. H. L. COOKE 1,854,542
AUDITORIUM
Filed Dec. 31, 1928 6 Sheets-Sheet 1

INVENTOR
Hereward Lester Cooke
BY Moses & Nolte
ATTORNEYS

April 19, 1932.  H. L. COOKE  1,854,542
AUDITORIUM
Filed Dec. 31, 1928    6 Sheets-Sheet 2

INVENTOR
Hereward Lester Cooke.
BY
Moses & Nolte
ATTORNEYS

April 19, 1932.  H. L. COOKE  1,854,542
AUDITORIUM
Filed Dec. 31, 1928    6 Sheets-Sheet 3

INVENTOR
Hereward Lester Cooke.
BY Moses & Nolte
ATTORNEYS

April 19, 1932. H. L. COOKE 1,854,542
AUDITORIUM
Filed Dec. 31, 1928 6 Sheets-Sheet 4

INVENTOR
*Hereward Lester Cooke.*
BY
*Moses & Nolte*
ATTORNEYS

April 19, 1932.　　　H. L. COOKE　　　1,854,542
AUDITORIUM
Filed Dec. 31, 1928　　6 Sheets-Sheet 5

INVENTOR
Hereward Lester Cooke.
BY
Moses & Nolte
ATTORNEYS

April 19, 1932.   H. L. COOKE   1,854,542
AUDITORIUM
Filed Dec. 31, 1928    6 Sheets-Sheet 6

INVENTOR
Hereward Lester Cooke.
BY *Moses & Nolte*
ATTORNEYS

Patented Apr. 19, 1932

1,854,542

UNITED STATES PATENT OFFICE

HEREWARD LESTER COOKE, OF PRINCETON, NEW JERSEY, ASSIGNOR TO COOKE PATENTS INCORPORATED, OF NEW YORK, N. Y., A CORPORATION OF DELAWARE

AUDITORIUM

Application filed December 31, 1928. Serial No. 329,473.

The acoustic difficulties encountered in the design of theatres, auditoriums, concert halls, etc., fall naturally under three heads. First, repeated reflections of sound waves from surfaces on which they fall may cause prolonged reverberation, due to insufficient absorption of energy at these surfaces. Second, reflected sound waves may be brought to more or less sharp focus close to the audience. Third, audibility conditions vary enormously over different sections of the audience, due to the fact that the intensity of sound proceeding unobstructed from its source diminishes with increasing distance from the source and the presence of obstructions of different kinds, and the reenforcement of the direct sound by reflected waves from walls and ceiling is in general distributed in an irregular and illogical manner.

The present invention provides a solution of these difficulties wholly or in part. It is possible, by this invention to produce a design of theatre or auditorium in which all three of these difficulties are substantially overcome, and in the preferred embodiments of this invention this is accomplished. The invention in its broader aspects, however, is not necessarily limited to structure overcoming all of the difficulties named.

The accompanying drawings illustrate diagrammatically the principles involved in the present invention and also show, more or less diagrammatically, the application of these principles to various illustrative embodiments of the invention. It is to be understood, however, that the invention is not limited to the particular forms of embodiments shown which are given as examples only. In these drawings.

Figure 1:
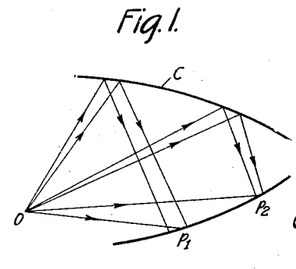
Figure 1 is a diagram showing, in longitudinal vertical section, portions of a floor and sound reflecting or ceiling surface of an auditorium and illustrating the paths of the sound waves.

The general nature of the principles underlying the present invention may be understood by reference to Fig. 1. O is a sound source, producing different audibility conditions at $p_1$ and $p_2$; C is a sound reflecting surface. If the surface C is so placed and formed with respect to the points O, $p_1$ and $p_2$ that the intensity of sound received at $p_2$ due to sound coming direct from O and by reflection from C is equal to the sound correspondingly received at $p_1$, then the audibility conditions at $p_1$ and $p_2$ will be taken as equal. The present solution of the general acoustic problem consists in forming a ceiling or reflecting surface corresponding to C, Fig. 1, such that equal audibility conditions may obtain over a considerable proportion of the area occupied by the audience in a hall. Such a ceiling constitutes a solution of the third acoustic difficulty listed above. In practice it is found that this form of ceiling also overcomes the first two difficulties, at least under certain reasonable conditions, and so constitutes a general solution of the problem.

Before proceeding to treat the problem analytically it will be necessary to define certain terms which will be employed. The intensity of sound at a point is taken as equal to the rate of flow of sound energy at the point across unit area taken normal to the direction of energy propagation. If more than one beam of sound originating from the same source passes a point, the intensity of sound at the point is reckoned as the arithmetical sum of the intensities due to all the beams considered independently. By intensity defect at one point with respect to a second point is meant the intensity of sound at the second point less that at the first point. The sound flux over a surface is the rate of flow of energy across the surface, without respect to direction.

It will be assumed initially that the intensity of sound conforms to the inverse square law with respect to varying distance from the source; in other words, that the intensity of sound decreases as the distance from the source increases in proportion to the square of such distance. Owing to the unavoidable presence of reflecting surfaces near the source, slight absorption of energy in transmission through the air, lack of uniformity in the distribution of energy on the wave front, and the invariable presence of other small disturbing factors, the inverse square law will never be obeyed with precision, even when the resonator effect of prolonged tones in the hall is neglected.

Figure 2:
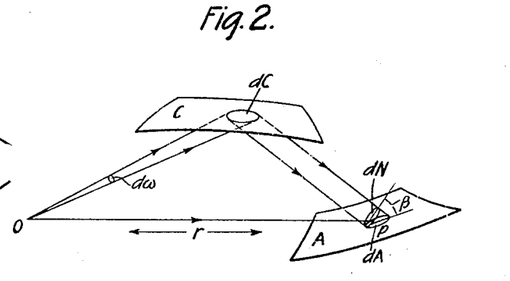
Figure 2 is a perspective diagram showing portions of similar surfaces.

The quantitative aspect of the present solution will now be considered. In Fig. 2, O is a source of sound producing unit intensity at unit distance. A is a surface receiving the sound direct from O and by reflection from C. If $p$ be a point on surface A at a distance $r$ from source O, it may be assumed that the intensity of the sound originating at O travelling directly to the point $p$ may be expressed as a function of the distance, $f(r)$, which for the moment may remain unspecified. A cone of small solid angle $d\omega$, with its apex at O, intercepts the reflector C in the element $dC$. The rate of flow of energy along this elementary cone is numerically equal to $d\omega$. This energy, impinging on the elementary surface $dC$, is reduced by absorption in the ratio $(1-\mu) : 1$, and subsequently falls on the elementary surface $dA$ which includes the point $p$. $dN$ is the projection of $dA$ normal to the direction of flow of energy from $dC$. Consideration will show that the intensity of sound at $p$ due to energy received direct from O and by reflection from C is given by the expression $$f(r) + (1-\mu)\frac{d\omega}{dN}.$$

If the value of this expression is K the following relation must hold $$(1-\mu)d\omega = \{K - f(r)\}dN \quad (1)$$

If now the surface C be so formed and placed with respect to O and A that Equation (1), applied to each point on the surface A, has the same numerical constant K, then the intensity of sound received at all points on the surface A, direct from O and by reflection from C, will be the same, and a listener placed at any point on the surface A will perceive any sound produced at O as possessing the same degree of apparent loudness, independent of his position on A. If the reflected sound reaching $p$ comes from a plurality of reflecting surfaces such as C, then Equation (1) will obviously assume the general form $$\Sigma\left\{(1-\mu)\frac{d\omega}{dN}\right\} = K - f(r) \quad (1')$$

If K be taken as the intensity of the direct sound from O at some critical distance R, then $f(R)$ may be written for K. Also, if $\beta$ be the angle between the normal to the element $dA$ and the direction of travel of the beam of reflected sound proceeding from $dC$ to $dA$, then, since $dN$ is equal to $dA \cos \beta$, Equation ($1'$) may be written in the form $$\Sigma \frac{(1-\mu)d\omega}{\cos \beta dA} = \{f(R) - f(r)\} \quad (1'')$$

If a definite surface A be chosen, and its position with respect to the sound source O be fixed, and if a definite value of R be chosen, and if some point $p$ be selected, through which the surface C is to be made to pass, then there will be one, and only one, form and position for the surface C which will exactly satisfy Equation (1″) for all points on the surface A. It is proposed to apply the term isophonic relationship to the form and relative position of two surfaces A and C and a source O which satisfy the conditions determined by Equation (1″), which will be referred to as the isophonic condition.

The practical problem of designing a ceiling C, Fig. 2, in isophonic relationship with an audience A and a source of sound O will now be considered. Two simple embodiments of the isophonic condition will be discussed in detail, and the general method of applying this equation to more complicated problems will be indicated briefly.

The first case to be considered will be that of a circular hall with the source of sound at the middle. The right hand half of the sectional elevation of such a hall is indicated diagrammatically in Fig. 3, in which OZ is the vertical axis through the centre of the hall, and in which the entire figure represents sections of surfaces of revolution generated by rotation of lines about OZ.

The point O is taken as the origin of sounds to be heard by an audience distributed on a surface generated by revolution of the line AA′, which may most advantageously be a portion of a logarithmic spiral conforming to the equation $r = e^{\phi/\alpha}$ having its origin on the line OZ, at a point which may, or may not, coincide with the origin of sound O. One advantage of placing an audience on a surface formed in this manner is that it provides every member of the audience with the same angular clearance in viewing the stage over the heads of the audience in front.

There is also a very important acoustical advantage in having an audience surface formed in this manner, due to the fact that an advancing sound wave proceeding from the source O is continually having energy stripped from its edge in contact with the audience as it travels to the back of the hall. If the angle of incidence between the direction of propagation of the sound and the audience surface be constant, as in the case of the particular form of surface under consideration, this stripping effect is constant over the entire audience, and the resulting audibility conditions over the entire hall represent a more logical and efficient arrangement than for an audience surface formed in any other manner.

In the case of an auditorium comprising galleries as well as a main floor, it is advantageous to have the audience surfaces of the galleries formed in the same manner as the audience surface of the main floor, these surfaces being all generated by revolution, about a vertical axis, of logarithmic spirals of the type $r = e^{\phi/\alpha}$. It is advantageous, but not essential, that the value of the constant $\alpha$ should be the same for each spiral used to generate the said audience surfaces.

Standard practice in theatre construction involves constructing audience surfaces in the form of a series of straight segments or steps. If a smooth curve drawn through these segments or steps approximates to a logarithmic spiral, the form of audience surface under consideration is substantially achieved. It is not necessary that all portions of the audience surface should be formed in this manner. For instance, those portions of such a surface at less than the critical distance from the sound source receive varying intensities of sound, and no appreciable acoustic disadvantage will result in having such portions of the audience surface depart from the logarithmic spiral form under discussion.

Figure 14:
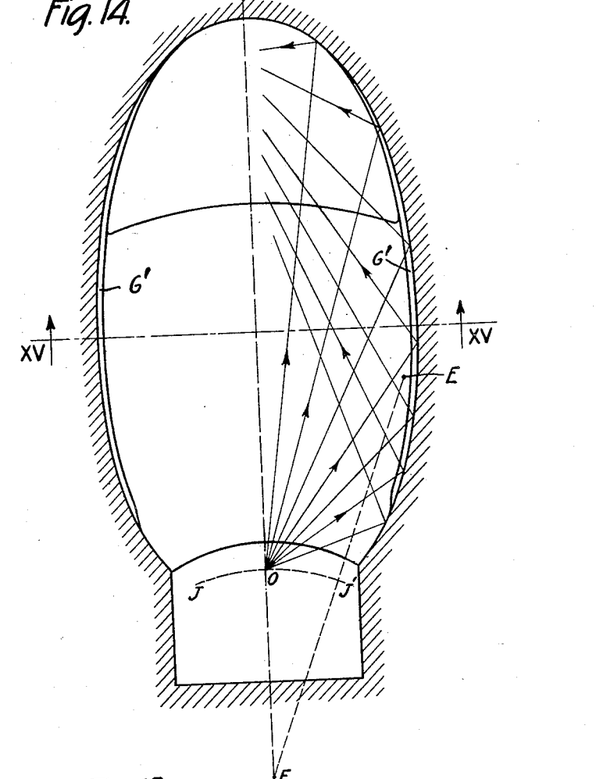
Figure 15:
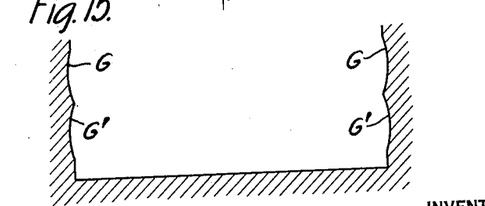
Figure 16:
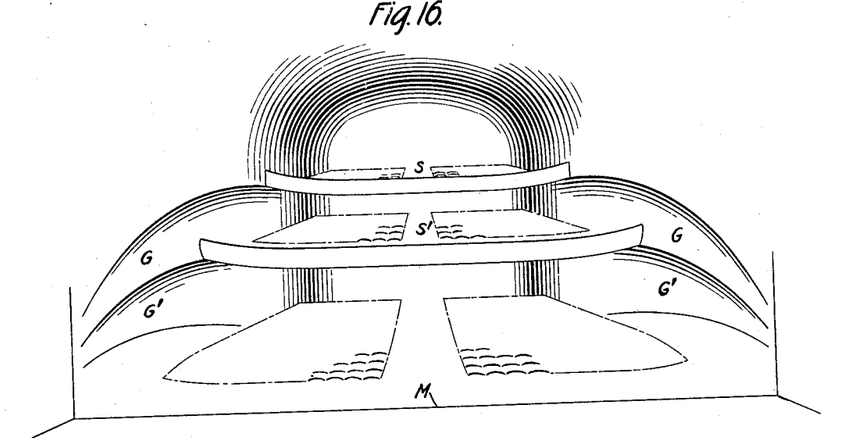

In generating these audience surfaces by revolution of logarithmic spirals about a vertical axis it is not essential that the origin of these spirals should lie on the vertical line passing through the assumed sound origin position on the stage, and it is not essential that the vertical axis of revolution of said spirals should pass through the origins of said spirals. This will be understood by reference to Fig. 14, a plan of an auditorium. A spectator placed in a lateral position E will have the greatest difficulty in seeing the side of the stage on his own side of the theatre. Thus the spiral used to generate the audience surface may be computed as having its origin at O, the sound source, when this generating spiral lies in the median position OH, but this spiral may advantageously be made to generate the desired audience surface by revolution about a vertical axis passing through some such position as F, a point on the median line of the theatre back of O, the origin of the spiral swinging on the arc J—J′. Procedure of this sort will of course modify the factor $\cos(\alpha \log_e r + \phi_0)$ in the isophonic equations considered below and will also modify the acoustic characteristics of the audience surface. However, with audience surfaces formed in this manner, no large acoustical error will be introduced by developing the ceiling curve to produce isophonic conditions on the assumption that the audience surfaces are generated by revolution of the logarithmic spirals about their origins, lying on the vertical through O, the factor $\cos(\alpha \log_e r + \phi_0)$ thus remaining in the isophonic equations unmodified.

Figure 3:
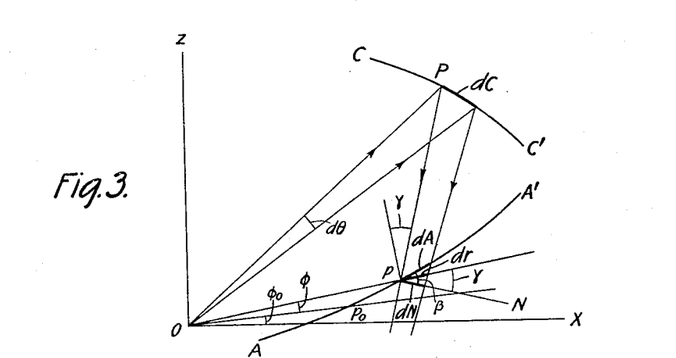
Figures 3 and 4 are geometric construction diagrams illustrating how the curvature of a sound reflecting surface (considered in longitudinal section) may be developed.

It is required to find the analytic conditions under which a portion of the ceiling CC′ Fig. 3, will be in isophonic relationship with a portion of the audience surface AA′ and source of sound O. This may be done by applying Equation (1″) to the problem under investigation.

Consideration will show that it will not be possible to establish equal audibility conditions over the entire audience surface but only over portions of this surface more remote from the sound source than some limiting critical distance R, which will depend primarily on the solid angle of the sound travelling from O to the ceiling CC', to be utilized after reflection for supplying the intensity defect at all portions of the audience more remote from O than the critical distance R. The value of this critical distance R in relation to the distance from the source of sound to the back rows of the audience may be determined readily in a given case by a method of trial and error, as will appear later.

Referring to Fig. 3, let the sound source O be the origin of a logarithmic spiral conforming to the equation $r = e^{\phi/\alpha}$, which is assumed to determine the surface AA'. In the equation $r$ is the distance from O of a point $p$ on the spiral, $\alpha$ is a numerical constant equal to the tangent of the angle included between any line drawn from the origin of the spiral to a point on the spiral and the line drawn tangent to the spiral at that point, and $\phi$ is the angle which the line O$p$ makes with the line drawn from O to the point on the spiral at unit distance from O. When this equation is employed to develop an audience surface the value of the numerical constant $\alpha$, and $\phi_0$, the angular elevation from O of the point on the spiral at unit distance R from O are so chosen by a method of trial and error as to yield an audience surface of such curvature and tilt as to result in the desired visual conditions for the audience. Let $p_0$, on AA' be at the critical distance from O, such that the intensity defect relative to $p_0$ is to be supplied to all portions of the audience more remote from O than $p_0$. Through $p_0$ draw O$p_0$ making with the horizontal OX the angle $\phi_0$. Let a conical sheet of sound of angular width $d\theta$, originating at O, intercepting the ceiling CC' at a point P in a strip of width $dC$, suffer diminution in intensity in the ratio $$(1-\mu) : 1,$$

and after reflection at $dC$ intercept the AA' surface in a strip of width $dA$. Let $p$ be the point at which the inner edge of the reflected sheet meets AA'. Through $p$ draw O$p$; and draw $p$N normal to P$p$. Let the reflected sheet of sound from $dC$ intercept OP and $p$N in strips of width $dr$ and $dN$, respectively. Let $\gamma$ be the angle included between $dr$ and $dN$, and let the distance O$p_0$ be taken as R, the unit of length. Since O$p_0$ is equal to R, and since by hypothesis, the intensity of sound at unit distance is assumed to be unity, $f(R)$ may now be taken equal to unity. It is obvious then that the angle $p$O$p_0$ is the value of $\phi$ corresponding to the point $p$ on the curve AA', at the distance $r$ from O. If the axis of reference of the spiral used to generate the audience surface AA' be taken as the line O$p_0$, the equation of this spiral is obviously $r = e^{\phi/\alpha}$.

The isophonic Equation, (1) modified to apply to the conditions contemplated in Fig. 3 may readily be shown to take the form:

$$(1-\mu)\cos\theta . d\theta = \cos\gamma . \cos(\alpha \log_e r + \phi_0)\left(r - \frac{1}{r}\right)dr \quad (2)$$

it being assumed that the inverse square law applies to sound waves originating at O.

Figure 4:
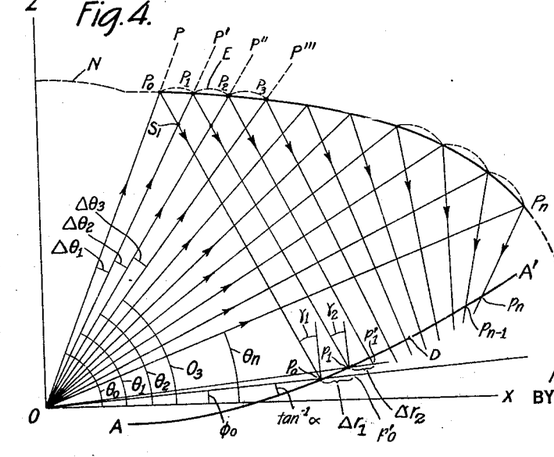

The method of applying Equation (2) to the problem of designing a ceiling for a definite form of circular hall will now be considered. In Fig. 4, a partial sectional elevation of a circular hall, of the same general type as that shown in Fig. 3, O is the source of sound, and also the origin of the spiral $r = e^{\phi/\alpha}$ employed to generate the audience surface AA', as already described.

Let the point A' represent the back row of the audience. Select the point $p_0$ on AA' such that $2Op_0 = OA'$, and let it be assumed as the basis of a first trial that it will be possible to supply all portions of the audience more remote from O than $p_0$ with reflected sound from a ceiling so as to supply the intensity defect, relative to $p_0$, to these outlying portions of the audience.

It is necessary to select, arbitrarily, a point $P_0$ at which to start the development of the curve of the ceiling in isophonic relationship with the sound source O and audience surface AA'. This point must be on the line OP, drawn so that the angle XOP represents the maximum angle of elevation of the path of sound from O which it is proposed to utilize by reflection from the ceiling to supply the intensity defect to the audience. In general $P_0$ may be conveniently but not necessarily selected so that the lines O$P_0$ and $p_0 P_0$ are equally inclined to the vertical. Let the angle POX be $\theta_0$. Draw OP' making with OX the angle $\theta_1$ less than $\theta_0$ by a small angle $\Delta\theta_1$. Join $P_0 p_0$. It is assumed that sound from O impinging on the ceiling at $P_0$ is to be reflected so as to meet the audience surface at $p_0$. $P_0$ and $p_0$ may then be termed points in correspondence on the ceiling and audience curves. It is now required to find another pair of points in correspondence on these curves such that sound proceeding from O along the line OP' will strike the ceiling point and be reflected to the audience point in correspondence with the said ceiling point, supplying at this latter point the intensity defect relative to $p_0$.

Figure 5:
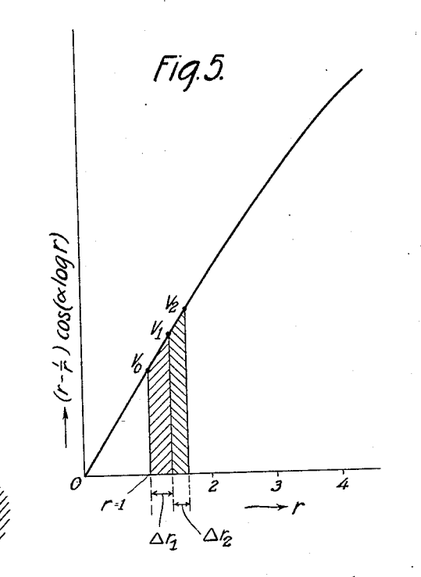
Figure 5 is a graph which may be used in solving one of the equations involved in plotting the curvature of a sound reflecting surface.

Construct the graph, Fig. 5, showing the relation between $$\left(r - \frac{1}{r}\right) . \cos(\alpha \log r + \phi_0) \text{ and } r.$$

As already explained, the values of $\alpha$ and $\phi_0$ determining the audience curve AA', Fig. 4, are arbitrarily selected to meet practical conditions. Let the distance $Op_0$ be R the unit of distance in reckoning values of $r$. Determine the angle between the normal to the line $Op_0$ and the line $P_0p_0$; this is the angle $\gamma_0$, corresponding to the point $p_0$. (Fig. 4).

Equation (2) must now be integrated between limits corresponding to the angles $\theta_0$ and $\theta_1$, Fig. 4. The integral of the left hand side of this equation is $(1-\mu)(\sin\theta_0 - \sin\theta_1)$. The right hand side of the equation may be handled with the aid of the graph in Fig. 5.

Let $V_0$ be the point on the graph in Fig. 5 corresponding to the condition $e^{\phi/\alpha} = R = 1$. Find a second point $V_1$ on the graph above and to the right of $V_0$ such that the area included under the segment $V_0V_1$ of the graph is numerically equal to $$(1-\mu)(\sin\theta_0 - \sin\theta_1)/\cos\gamma_0.$$

The segment on the $r$ axis below this area is the value of $\Delta r_1$, corresponding to $\Delta\theta_1$. On the line $Op_0$, to the right of $p_0$ find a point $p'_0$ whose distance from $p_0$ is equal to $\Delta r_1$. On the line $Op_0$, to the right of $p_0$ find a point $p'_0$ whose distance from $p_0$ is equal to $\Delta r_1$. With $S_1$, the intersection of the lines $P_0p_0$ and $OP'$ as center, and $S_1P_0$ as radius, describe a circle cutting $OP'$ in the upper point $P_1$. Draw the line $P_1p_0$ cutting the audience curve $AA'$ in the point $p_1$. $P_1$ and $p_1$ constitute a second pair of points in correspondence on the ceiling and audience curves respectively, such that sound originating at $O$ and reflected from $P_1$ will arrive at $p_1$.

A third pair of points in correspondence, $P_2$ and $p_2$ on the ceiling and audience curves respectively may be located by starting with the points $P_1$ and $p_1$ and proceeding just as in the case of the points $P_0$ and $p_0$, and finding a point $V_2$ on the graph in Fig. 5 such that the area under the segment $V_1V_2$ is numerically equal to $$(1-\mu)(\sin\theta_1 - \sin\theta_2)/\cos\lambda_1,$$

where $\theta_1 - \theta_2$ is a new angular increment $\Delta\theta_2$ and $\gamma_1$ is the angle at the point $p_1$ corresponding to the angle $\gamma_0$ at the point $p_0$.

A series of points $P_0, P_1, P_2 — P_n$ may be located by this procedure. A smooth curve drawn through these points constitutes the ceiling curve in isophonic relation to the source $O$ and the audience curve $AA'$. This ceiling curve is an approximation to the exact curve sought, and the approximation may be made as close as desired by taking sufficiently small angular increments $\Delta\theta_1, \Delta\theta_2$, etc, in the process of developing it.

Equation (2) employed in the above described process of developing the ceiling curve, is based on the assumption that $$f(r) = \frac{1}{r^2}.$$

If the inverse square law does not hold, but $f(r)$, representing the sound intensity at a distance $r$ from the source is known, then Equation (2) will assume the form.

$$(1-\mu)\cos\theta.d\theta =$$
$$\cos\gamma \cdot \cos(\alpha\log_e r + \phi_0)\{f(R) - f(r)\}r.dr \quad (2')$$

which may be used in developing a ceiling curve by a process precisely analogous to that described above.

If a ceiling curve $P_0P_n$, produced in this way, is found to supply the intensity defect as far as some point $p_n$ which does not coincide with $A'$, at the back row of the audience, another trial should be made, shifting the initial starting point $p_0$ towards or away from $O$, according to whether $p_n$, determined by the first trial, lies farther from or nearer to $O$ than the point $A'$.

Curves produced in this way, conforming to Equation (2) will vary in form and position with changes made in the arbitrarily imposed conditions of the solution, such as the values of $\mu, \theta_0, \alpha, \phi_0$, and the position $P_0$. Practice in drawing these curves will however make it possible to predict the general type of change in the form and position of the ceiling which is to be anticipated from a given change in any of the arbitrary constants, so that the most satisfactory ceiling curve to meet any specified requirements may be arrived at without undue labor.

Diffraction effects at the forward and rear edges of the ceiling may be obviated by continuing the ceiling surface in a smooth curve some distance beyond the limits determined by the process described. An extension of the curve to avoid diffraction disturbances is shown by the dotted lines in Fig. 4. The portion N of the ceiling in the neighborhood of the stage may conveniently be made spherical about $O$ as center, so as to return to the stage all sound not utilized in supplying the intensity defect to portions of the audience.

At the point marked D in Fig. 4 whose distance from $O$ is $$\sqrt{2}$$

the intensity defect is equal to the intensity of the direct sound from $O$. If the path difference of the direct and reflected sound from $O$ is equal to an odd number of half wave lengths of a musical tone originating at $O$, the resulting intensity of this tone at $D$ will be zero. This interference effect will decrease with increasing distance from D. Owing to the unavoidable presence of reflecting surfaces in the neighborhood of $O$ and $D$ it is certain that total tone extinction will never occur at $D$, and this interference effect will not be unpleasantly noticeable. Effects of this sort, which undoubtedly occur in most halls and auditoriums, are seldom detected.

Calculations based on the actual design of a theatre conforming to the principles discussed with an audience of approximately 3000 distributed over a horizontal angle of two radians, show that the maximum time lag of the reflected sound behind the direct sound may readily be reduced to the order of 1/40 second, which is about the limiting interval permissible if perceptible duplication of percussion sounds originating at O is to be avoided. For a hall of given seating area this time lag may be reduced by selecting a point lower down on the line OP, Fig. 4, for $P_0$, the starting point for the ceiling curve. If $P_0$ is chosen too low down on OP an undesirable effect will be produced, because the corresponding reduction in height of the ceiling and the inclination downward toward the stage will result in unpleasant architectural effects. It is also obvious that troublesome focal regions near the plane of the audience are eliminated in this type of theatre design. It thus appears that reverberation will be reduced to a minimum, reflected sound will not be focussed near the audience surface and beyond the critical distance there will be no apparent falling off in the intensity of sounds received from the stage. The proposed design therefore constitutes a single solution to the three acoustical difficulties listed above. A general type of hall which embodies the suggested principles is shown diagrammatically in Fig. 6, which shows the hall and stage plan, and in Fig. 7, a longitudinal median sectional elevation. It will be observed that acoustically the design practically comprises only ceiling and floor, since no appreciable reflection of sound occurs from the lateral walls, on which sound waves from the stage fall at grazing angles.

Figure 7:
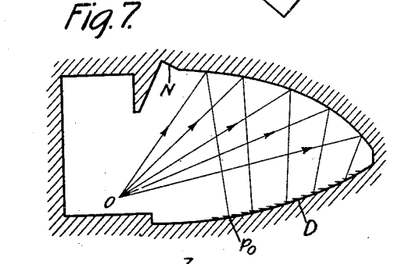

It will be noted in Fig. 7 that the reflected sound, especially towards the back of the audience, where it is stronger than the direct sound, being more remote from O than D, (cf. Fig. 4) may come from above and behind the audience position where it is ultimately received. Thus in the back seats the sound will appear to come synchronously from two distinct sources, a weak real source on the stage, and a stronger virtual source above and behind the listener. To a person unaccustomed to this type of theatre design this peculiarity in the acoustic condition may occasion some slight discomfort, æsthetically. But it is not to be anticipated that the average person will experience any but a transient difficulty in accommodating himself to this condition, and the increased audibility effected by this type of design may be confidently expected to offset this temporary disadvantage.

Figure 8:
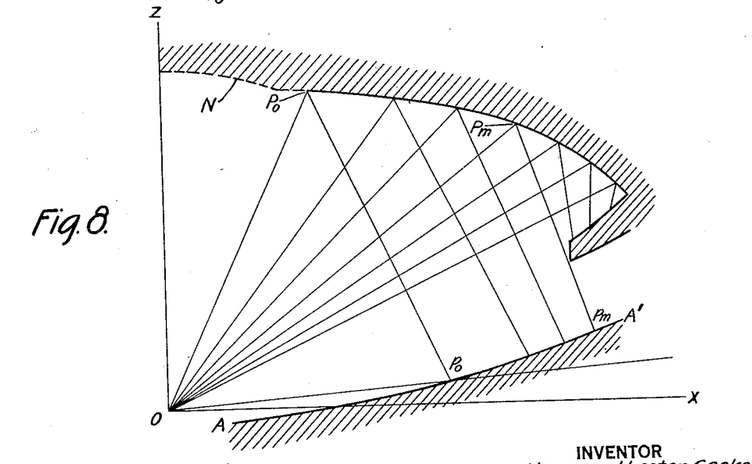
Figure 8 is a diagrammatic longitudinal vertical section of an auditorium having a gallery or balcony showing how the principles of the invention may be applied to developing a sound reflecting surface of such an auditorium.

If the isophonic relationship is to be established between a ceiling, a broken audience surface comprising main floor and gallery, and a source O, as in Fig. 8, this may be accomplished readily by starting to develop the ceiling curve from the points $P_0$ and $p_0$ as before, and carrying the ceiling curve back to a point $P_m$, Fig. 8, corresponding to $p_m$, the most remote point of the audience on the main floor which can be reached by sound from O singly reflected from the ceiling, and then developing the ceiling curve beyond $P_m$ to be in isophonic relationship with the gallery portion of the audience surface and the source O, proceeding exactly as described in connection with Fig. 4. A ceiling curve of the type shown in Fig. 8 may be developed in this manner.

Figure 6:
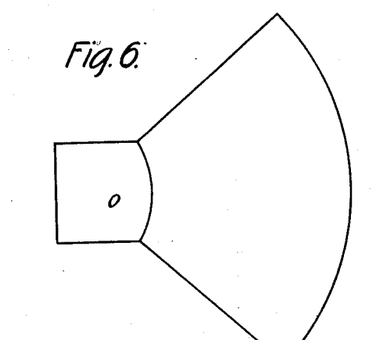
Figures 6 and 7 are a diagrammatic plan and longitudinal vertical section, respectively, of a type of hall constituting an embodiment of the principles of the invention in elementary form.

The form of ceiling design developed in Figs. 4 and 8 are well adapted for theatres of the radial form shown in Fig. 6. The position of the source O, which determines the form of the ceiling surface, may be estimated in relation to the most probable position of the characters on the stage, and the corresponding acoustic image positions determined by the floor of the stage and other neighboring sound reflectors, allowance being made for the intensity of the virtual sound sources created by these reflectors, each image being "weighted" according to its calculated intensity, and the centre of mass of these "weighted" sources being taken as the source of sound employed in developing the design. The ceiling curve developed in this manner, on the assumption that the intensity of sound varies as the inverse square of the distance from this source, will represent a surface adapted to conform in its acoustic action to the isophonic condition. This condition will not hold exactly, but will be approximated as the speakers move from place to place on the stage. The design developed as described is to be regarded as a practical solution of the problem of establishing exact isophonic relationship between stage, audience surface and ceiling for the average conditions under which the theatre is to be used.

Turning now from the requirements of a theatre to those of a concert hall it is obvious that the conditions to be reckoned with in arriving at an isophonic ceiling design may be totally different from those to be considered in connection with a theatre. If the hall is to be used for orchestral or choral performances the source of sound will of necessity be extended, and may no longer be treated as a point source. It may be stated at the outset that the problem of arriving at an isophonic design to meet the conditions of an extended sound source is essentially that of determining an optimum design for the purpose in view rather than arriving at a form to establish exact isophonic relationship between each part of the extended sound source and the audience and ceiling surface. If the area over which the orchestra or choir is to be distributed is a small fraction of the area of the hall, then no large departure from exact isophonic relationship is to be anticipated if the centre of the area occupied by the orchestra or choir is regarded as a point source of sound to be accommodated, and a ceiling design developed by the method already described. If however the area occupied by the orchestra or choir is neither small nor concentrated in the neighborhood of a point, then other methods of arriving at an approximately isophonic design will have to be resorted to.

Figure 9:
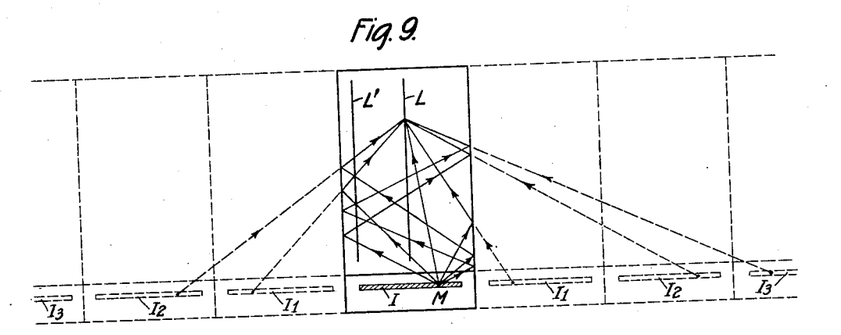
Figures 9, 10 and 11 are diagrams illustrating the application of the invention to a concert hall in which it is assumed that the sound does not come from a point source, but from a source distributed horizontally across the platform as in the case of an orchestra or chorus, Figure 9 being a diagram in plan, the central rectangle of which represents the hall and the adjoining dotted rectangles representing the successive acoustic images produced by reflection of the sound waves on the side walls of the hall, Figure 10 being a diagrammatic transverse section of the hall showing the side walls converging somewhat towards the ceiling, and Figure 11 being a longitudinal vertical section of the hall.
Figure 10:
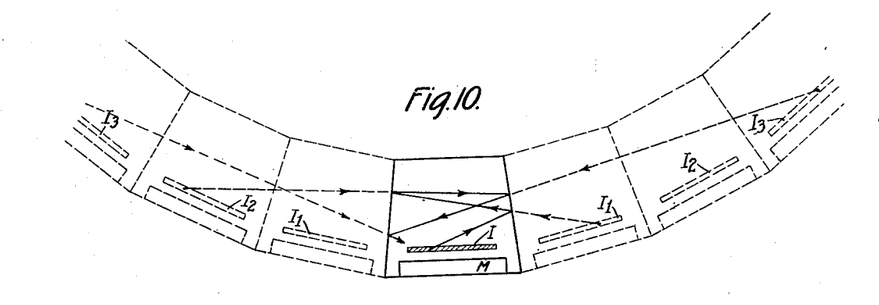

The general method of dealing with specific problems in which other than point sources of sound are involved may be illustrated by a practical example. Imagine a hall with parallel vertical, or inclined, side walls, and the platform extending across the entire end of the hall, as indicated in Figs. 9 and 10 in which M is the platform. Let the arrangement of an orchestra on this platform extend in a narrow strip I from wall to wall, as shown by the shaded portion in the figure. This arrangement of the orchestra may be regarded as equivalent to a line source of sound. Let it be assumed that the rate of emission of sound energy from unit length of this line is unity. The side walls of this theatre will form an extended line of acoustical images $I_1$, $I_2$, $I_3$, etc. of the orchestra line, and if $\mu'$ is the absorption coefficient of the walls the relative intensities of the sound emitted from the orchestra line and from successive acoustic images of this line on either side of the hall will be as $$1:(1-\mu'):(1-\mu')^2:(1-\mu')^3 \ldots \text{etc.}$$

Figure 11:
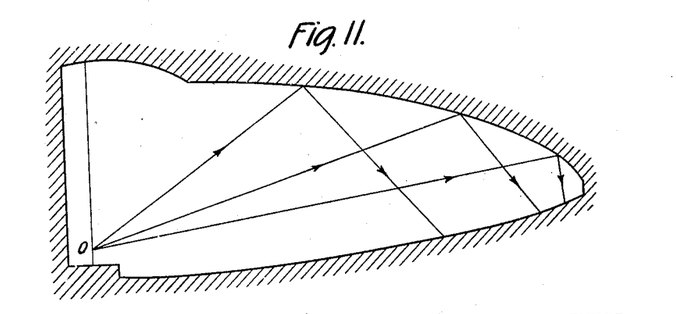

By added integration of a series of terms it will now be possible to determine the manner in which the sound coming from the orchestra and its acoustical images varies with the distance from I along the median line of the hall L, and along a lateral parallel line L', near one of the walls. The average manner in which the sound intensity varies with distance from I along these two lines may be taken as $f(d)$, representing the intensity of the sound in the hall as a function of the distance $d$ from the orchestra line I. The isophonic condition as applied to the present problem may then be shown to assume the form, $$(1-\mu)d\theta = \{f(R)-f(d)\} \cdot dN \quad (3)$$

where R is the critical distance from I in terms of which intensity the intensity defect is reckoned and $\mu$ is the absorption coefficient of the ceiling, $d\theta$ is the elevational angular width of a sheet of sound originating in the orchestra line, which after reflection at the ceiling and reduction of intensity in the ratio $(1-\mu):1$ is made to fall on the audience surface in a strip of width $dN$ measured normal to the flow of energy. If a graph of $f(d):d$ be plotted, it will be perfectly obvious how Equation (3) may be employed in developing a ceiling curve in isophonic relationship with the line source I and any given audience surface in a hall such as that shown diagrammatically in Fig. 11, the process being analogous in every way to that described in developing the ceiling curve in Fig. 4. Fig. 11 shows the general form of ceiling and audience surfaces in isophonic relationship with a line source I which conforms to Equation (1″). It should be noted however that the audience and ceiling surfaces considered in connection with Figs. 9, 10 and 11 are of cylindrical curvature, and do not represent surfaces of revolution about an axis at a finite distance, as in Fig. 4. It should also be noted that in halls of the type contemplated in Figs. 9, 10 and 11, the coefficient of sound absorption of the walls should be made as large as is practically feasible.

The problem of producing satisfactory audibility conditions for portions of an audience seated beneath galleries and balconies in a theatre or concert hall is a very difficult one to deal with practically. Under ordinary circumstances these portions of the building are reached by practically nothing but the direct sound, which is seriously reduced in intensity by attrition at the boundaries of the wave front, resulting in excessively low sound intensities at these portions of the house.

Figure 12:
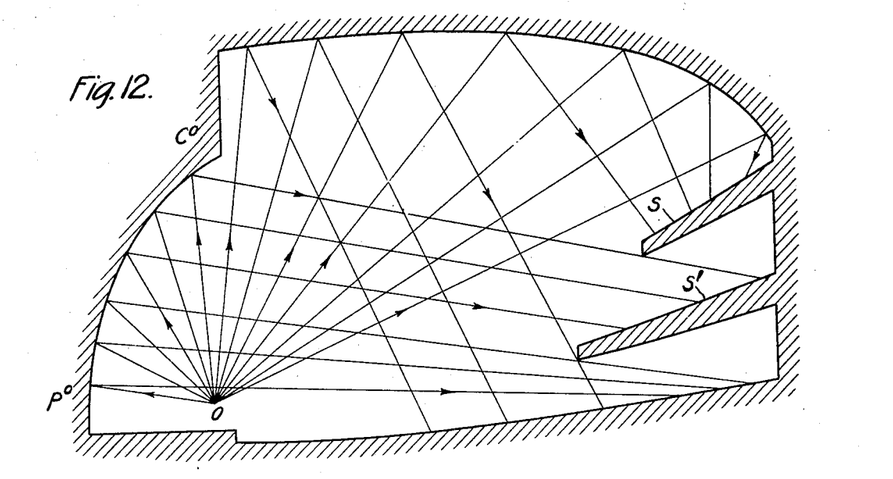
Figure 12 is a diagram in longitudinal vertical section of a concert hall having two galleries, and having a curved reflecting surface behind the stage for directing sound waves under the galleries.
Figure 13:
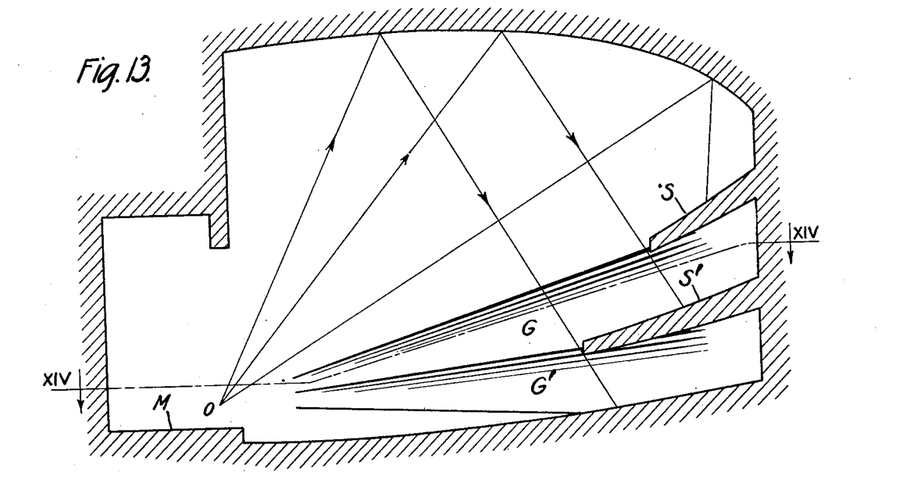
Figures 13 to 16 illustrate a theatre constructed in accordance with principles of the invention and having two galleries, Fig. 13 being a longitudinal vertical section, Fig. 14 a substantially horizontal section on line XIV—XIV of Fig. 13, Fig. 15 being a partial transverse vertical section on line XV—XV of Fig. 14 and Fig. 16 being a perspective elevation of the house as seen from a point above the stage.

The difficulty may be overcome readily in a concert hall of the general type illustrated in Figs. 9, 10 and 11 by continuing the curve of the roof down behind the sound source, as shown by the portion $P_0C_0$, Fig. 12, and curving this portion so as to shoot the sound into the audience spaces beneath the balconies. This is shown clearly in Fig. 12 as will appear by a study of the paths of the reflected sound from its origin at the source O to its destination beneath the galleries. The curvature of the ceiling portion $P_0C_0$ should be arranged so that the intensity defect at points covered by balconies is over-corrected. This is necessary on account of energy attrition at the boundaries of the advancing wave fronts of both the direct and reflected sound beneath the galleries. The method of calculating the curvature of the portion $P_0C_0$ of the reflecting surface in Fig. 12 is strictly analogous to that already described in connection with Figs. 4, and 9, 10 and 11, and calls for no further description.

The method of supplying the intensity defect beneath the galleries of a hall described above in connection with Fig. 12 is feasible only in an auditorium in which the space above and behind the sound source is available for a suitably formed reflecting ceiling. In the case of a theatre however, the stage lies back of the proscenium opening, and the requirements of scenery, etc., render it impossible that the solution of the difficulty proposed in the foregoing paragraph should be applicable to theatres. This difficulty in theatres may be overcome by the following general method. Figs. 13 to 16 show a theatre or portions thereof in plan and elevation, and in perspective elevation, the latter representing the view of the house from the stage M. Galleries S, S' introduce the problem of supplying adequate sound intensity to portions of the audience which they cover. Concave grooves G, G' are so formed and placed as to focus thin horizontal sheets of sound on the sections of the audience beneath the galleries, and thus supply the intensity defect to these sections. In determining the radii of vertical and horizontal curvature of these grooves from place to place, and their correct relation to the sound source O, the aim should be to distribute the horizontal curvature of the grooves (Fig. 14) so as to supply as even a distribution as possible of reflected sound over the area to be served and to locate the concave grooves G, G', and adjust their vertical curvature so as to concentrate as much sound as possible in a thin sheet, directed so as to pass into the gap beneath the balcony. This thin sheet will suffer heavy energy losses due to diffraction at the upper and lower boundaries of the advancing waves, and these energy losses cannot be computed with any degree of certainty. It is to be expected that in practice, the best procedure will be to produce as even a horizontal distribution as possible of the reflected sound beneath the galleries (cf. Fig. 14) and arrange for the grooves G, G', to have the maximum vertical width possible, and so to shoot the maximum possible amount of reflected sound through the gap under the gallery to the audience seated there. In general it will be advantageous in the design to have the opening beneath the balcony, the source of sound on the stage and the groove in a single plane, though this is not absolutely essential.

In the form of isophonic design considered in Fig. 4 it is to be noted that the ceiling is so formed and placed with respect to the source that the reflected rays of sound at the ceiling are constrained to the same vertical plane as the incident rays. This is not an essential feature of isophonic design. For instance, with a sound source which is effectively a point it is perfectly obvious that an egg-shaped ceiling may be designed in which the relation between its form and position and the arrangement of an audience surface and sound source constitutes an isophonic relationship complying with the isophonic condition. This is the form of ceiling which is most readily adapted to a theatre having a plan involving curved side walls, as in Figs. 14–17. In the case of an egg-shaped ceiling of this kind, the incident and reflected sound rays will in general lie in different vertical planes.

Figure 18:
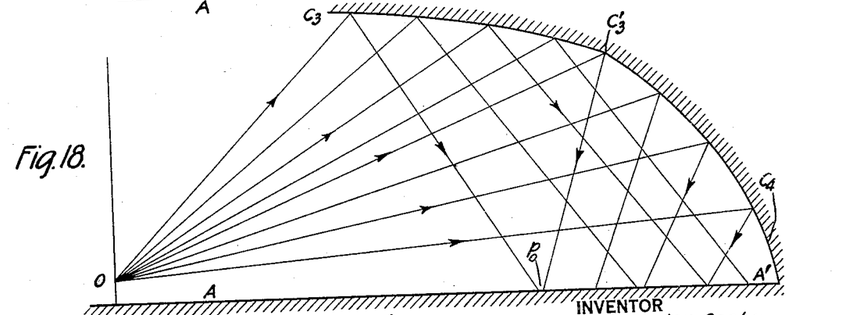

The summation term in Equation (1″) contemplates the use of a plurality of reflecting surfaces, which may be either ceiling or wall surfaces, or a combination of these surfaces, to secure the desired isophonic relationship between sound source, reflecting surfaces and audience surface or surfaces. The general method of designing such reflecting surfaces so that in conjunction they may result in the desired isophonic relationship may be understood by reference to Fig. 18, in which AA' is an audience surface, O is a sound source, and $C_3C'_3$ and $C'_3C_4$ are two ceiling surfaces which in combination produce isophonic conditions over that portion of the audience surface more remote from O than some point $p_0$, which may be located by a method of trial and error, as previously explained. Let the solid angles subtended at O by the surfaces $C_3C'_3$ and $C'_3C_4$ be $\Omega_1$ and $\Omega_2$ respectively. The ceiling surface $C_3C'_3$ is developed by the use of Equation (1″) in the form $$(1-\mu)\,d\omega = \frac{\Omega_1}{\Omega_1+\Omega_2}\{f(R)-f(r)\}dA \cdot \cos\gamma,$$

starting at the point $C_3$, which is located in a suitable practical position by the method of trial and error, the method of development of this surface being similar to that already described in connection with Fig. 4. When the form of the surface $C_3C'_3$ has been determined in this manner, the surface $C'_3C_4$ is developed in a similar manner, starting at the point $C'_3$ and employing Equation (1″) in the form $$(1-\mu)\,d\omega = \frac{\Omega_2}{\Omega_1+\Omega_2}\{f(R)-f(r)\}dA \cdot \cos\gamma.$$

It is of course to be understood that the development of these reflecting surfaces of the type shown in Figs. 4 and 18 may if desired be effected by starting at the point most remote from the sound source O and carrying the process of development forward, instead of backward, as described. There are advantages in both methods of procedure.

Figure 17:
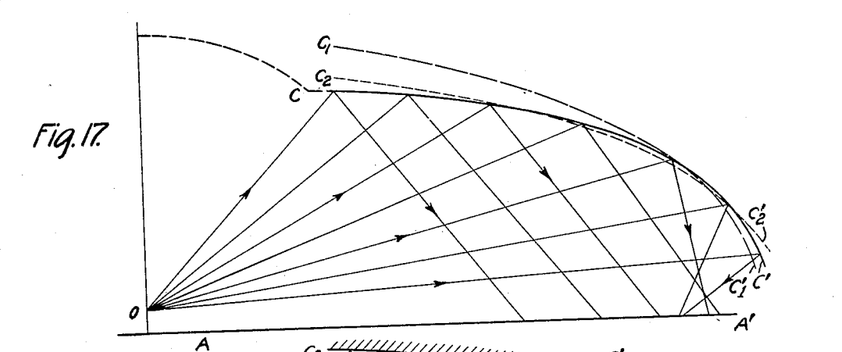
Figures 17 and 18 are diagrams in longitudinal vertical section of halls showing the adaptability of the invention to halls having flat floors and also showing different ways in which the ceiling curvature may be approximated.

It should be noted that an isophonic design does not consist simply of a special form of ceiling, but that the isophonic relationship consists of an assemblage of formed surfaces and a sound source arranged in a definite relationship to each other. Approximate conformity to the isophonic relationship in a design will result in approximately isophonic acoustical conditions. Thus in Fig. 17, showing a theatre design in elevation, if CC' is the correct ceiling curve for the source O and audience surface AA' then this same ceiling curve if shifted into the position $C_1C'_1$ will cease to be in isophonic relationship to the source O and audience surface AA' and the departure from the correct relationship will be correspondingly small as the ceiling curve is located nearer the correct position. The isophonic relationship is substantially established if the ceiling curve CC' is made to lie close to the theoretically correct position as shown in Fig. 17. Similarly a ceiling curve $C_2C'_2$, incorrect in both form and position, may be made to approximate to the correct form and position, as shown, and so, while theoretically incorrect in both form and position, may be made substantially to result in the isophonic relationship. It is intended that the subtended claims should be construed broadly to cover cases of this sort in which the isophonic relationship is substantially established.

In the preferred embodiment of the present invention, as described above, the reflecting surfaces are so curved as to supply the full intensity defect to all portions of an audience beyond a certain critical distance from the sound source. The invention may however be modified so as to effect any desired distribution of intensity of the combined direct and reflected waves. For instance it might be deemed advisable in a circular theatre of the type shown in Figs. 6 and 7 to have the sound intensity of combined direct and reflected waves vary inversely as some function, $F(r)$, of the distance, $r$, measured from O, of points beyond some critical distance from O. Then at a distance $r$, reckoned in terms of the critical distance as the unit of length, if it should be desired to produce an intensity $F(r)$, the intensity at the critical distance being taken as unity, Equation (1″) would then assume the form $$\Sigma \left\{ (1-\mu) \frac{d\omega}{dN} \right\} = F(r) - f(r) \quad (4)$$

which equation may be handled by methods strictly analogous to those already described, to determine the required form and position of the ceiling curve. It follows that the total intensity may be made to either increase or decrease with respect to the intensity at the critical distance as the distance beyond the critical distance increases.

It should be observed that in the sound reflecting surfaces described the curvature of such surfaces increases with increasing distance from the sound source. Under certain normal practical conditions this is a characteristic feature of sound reflecting surfaces in isophonic relationship with a normally disposed audience surface and sound origin position in an auditorium.

While the principles underlying this invention have been described, and have been illustrated as applied to various conditions which may be met with in the design of particular forms of auditoriums and theatres, it is to be understood that the invention is of general application, and that the principles above set forth may be utilized in working out constructions suitable for other conditions than those illustrated. It is not intended, therefore, to limit the invention to the specific examples given, but on the contrary to cover the invention broadly in whatever form its principles may be embodied. It will be noted that in the examples of auditoriums given, conditions have been laid down for equal sound intensities for all distances from the sound origin greater than the critical distance. I wish it understood that this condition for substantially equal sound intensity shall be satisfied when no difference in intensity can be perceived by the unaided human ear.

In the claims, the symbols used shall be given the meaning ascribed to them in the specification.

What I claim is:

1. The method of obtaining isophonic conditions in auditoriums which consists in reflecting certain of the sound waves emanating from a sound source in such manner as to reenforce the sound waves proceeding directly from the sound source upon those parts of the audience area of the auditorium in which the sound intensity due to the waves proceeding directly from the source is less than a desired minimum.

2. The method of obtaining isophonic conditions in auditoriums which consists in reflecting sound waves emanating from a sound source in such manner as to reenforce the direct sound waves proceeding from the sound source, the reflected sound waves being caused to traverse a path in reaching any given area which shall not exceed the path traversed by the direct sound waves reaching said area in an amount sufficient to cause distinguishable duplication of sound effects, the reflected sound waves being sufficient in amount to supply the sound intensity defect at any given area in the audience space whereby the sum of the intensities of the direct and reflected sound waves reaching any given portion of the audience space shall be not less than a desired minimum.

3. An auditorium having a sound origin position, an audience floor and an audience gallery, and sound reflecting surfaces, a portion of said sound reflecting surfaces being arranged to reflect the sound waves to the audience floor to reenforce direct sound waves proceeding from the origin to the said floor, and a portion of said sound reflecting surfaces being arranged to reflect sound waves to said gallery to reenforce direct sound waves proceeding from said origin to said gallery.

4. An auditorium having a sound origin position, an audience floor and an audience gallery, and sound reflecting surfaces, a portion of said sound reflecting surfaces being arranged to reflect the sound waves to the audience floor to reenforce direct sound waves proceeding from the origin to the said floor, and a portion of said sound reflecting surfaces being arranged to reflect sound waves to said gallery to reenforce direct sound waves proceeding from the origin to said gallery, said reflecting surfaces being positioned and shaped in accordance with the condition that the sum of the sound intensities of the direct and reflected waves reaching any given portion of said floor and gallery audience areas shall be at least equal to a desired minimum sound intensity.

5. An auditorium having a sound origin position, an audience floor and an audience gallery, and sound reflecting surfaces including vertically curved surfaces extending along the side walls of the auditorium for reflecting sound waves in generally transverse planes to the audience area beneath the gallery.

6. An auditorium having a sound origin position, an audience floor and an audience gallery, and sound reflecting surfaces, a portion of said sound reflecting surfaces being arranged to reflect the sound to the audience floor to reenforce direct sound waves proceeding from the origin to the said floor and a portion of said sound reflecting surfaces being arranged to reflect sound waves to said gallery to reenforce direct sound waves proceeding from the origin to said gallery, said sound reflecting surfaces including vertically curved surfaces extending along the side walls of the auditorium for reflecting sound waves in generally transverse planes to the audience area beneath the gallery.

7. An auditorium having an audience surface in which the median vertical section is a curve conforming substantially to the equation $r = e^{\phi/\alpha}$.

8. An auditorium having a stage and an audience surface so formed that a section of said surface formed by a vertical plane traversing the stage is a curve conforming substantially to the equation $r = e^{\phi/\alpha}$.

9. An auditorium having a stage and an audience surface so formed that a plurality of sections of said surface formed by a plurality of vertical planes traversing the stage are curves conforming to substantially equations of the type $r = e^{\phi/\alpha}$.

10. An auditorium having a plurality of audience surfaces, the median vertical sections through which are curves conforming substantially to equations of the type $r = e^{\phi/\alpha}$.

11. An auditorium having a stage and a plurality of audience surfaces so formed that sections of said surfaces formed by a vertical plane traversing said stage are curves conforming substantially to equations of the type $r = e^{\phi/\alpha}$.

12. An auditorium having a stage and a plurality of audience surfaces so formed that sections of said surfaces formed by a plurality of vertical planes traversing the stage are curves conforming substantially to equations of the type $r = e^{\phi/\alpha}$.

13. An auditorium comprising a sound origin position, a sound reflecting surface and an audience surface in isophonic relationship in substantial conformity with the equation $$(1-\mu)d\omega = (f(R) - f(r))dN.$$

14. An auditorium comprising a sound origin position, a plurality of sound reflecting surfaces and an audience surface in isophonic relationship in substantial conformity with the equation $$\Sigma\left\{(1-\mu)\frac{d\omega}{dN} = f(R) - f(r)\right\}.$$

15. An auditorium comprising a sound origin position, a sound reflecting surface and a plurality of audience surfaces in isophonic relationship in substantial conformity with the equation $$(1-\mu)d\omega = (f(R) - f(r))dN.$$

16. An auditorium comprising a sound origin position, a plurality of sound reflecting surfaces and a plurality of audience surfaces in isophonic relationship in substantial conformity with the equation $$\Sigma\left\{(1-\mu)\frac{d\omega}{dN}\right\} = f(R) - f(r).$$

17. An auditorium comprising a sound origin position, a sound reflecting surface and an audience surface in isophonic relationship in substantial conformity with the equation $$(1-\mu)d\omega = (f(R) - f(r))dN,$$

in which the median vertical section of said audience surface is a curve conforming substantially to the equation $r = e^{\phi/\alpha}$.

18. An auditorium comprising a stage, and a sound origin position, a sound reflecting surface and an audience surface in isophonic relationship in substantial conformity with the equation $$(1-\mu)d\omega = (f(R) - f(r))dN,$$

said audience surface being so formed that a section of said surface formed by a vertical plane traversing the stage is a curve conforming substantially to the equation $r = e^{\phi/\alpha}$.

19. An auditorium comprising a stage, and a sound origin position, a sound reflecting surface and an audience surface in isophonic relationship in substantial conformity with the equation $$(1-\mu)d\omega = (f(R) - f(r))dN,$$

said audience surface being so formed that a plurality of sections of said surface formed by a plurality of vertical planes traversing the stage are curves conforming substantially to equations of the type $r = e^{\phi/\alpha}$.

20. An auditorium comprising a sound origin position, a plurality of sound reflecting surfaces and an audience surface in isophonic relationship in substantial conformity with the equation $$\Sigma\left\{(1-\mu)\frac{d\omega}{dN}\right\}=f(R)-f(r),$$

the median vertical section of said audience surface being a curve conforming substantially to the equation $r=e^{\phi/\alpha}$.

21. An auditorium comprising a stage, and a sound origin position, a plurality of sound reflecting surfaces and an audience surface in isophonic relationship in substantial conformity with the equation $$\Sigma(1-\mu)d\omega=(f(R)-f(r))dN,$$

said audience surface being so formed that a section of said surface formed by a vertical plane traversing the stage is a curve substantially conforming to the equation $r=e^{\phi/\alpha}$.

22. An auditorium comprising a stage, and a sound origin position, a plurality of sound reflecting surfaces and an audience surface in isophonic relationship in substantial conformity with the equation $$\Sigma\left\{(1-\mu)\frac{d\omega}{dN}\right\}=f(R)-f(r),$$

said audience surface being so formed that a plurality of sections of said surface formed by a plurality of vertical planes traversing the stage are curves conforming substantially to equations of the type $r=e^{\phi/\alpha}$.

23. An auditorium comprising a sound origin position, a sound reflecting surface and a plurality of audience surfaces in isophonic relationship in substantial conformity with the equation $$(1-\mu)d\omega=\{f(R)-f(r)\}dN,$$

the median vertical sections of said audience surfaces being curves conforming substantially to equations of the type $r=e$.

24. An auditorium comprising a stage, and a sound origin position, a sound reflecting surface and a plurality of audience surfaces in isophonic relationship in substantial conformity with the equation $$(1-\mu)d\omega=\{f(R)-f(r)\}dN,$$

the sections of said audience surfaces formed by a vertical plane traversing the stage being curves conforming substantially to equations of the type $r=e^{\phi/\alpha}$.

25. An auditorium comprising a stage, and a sound origin position, a sound reflecting surface and a plurality of audience surfaces in isophonic relationship in substantial conformity with the equation $$(1-\mu)d\omega=\{f(R)-f(r)\}dN,$$

the sections of said plurality of audience surfaces formed by a plurality of vertical planes traversing the stage being curves conforming substantially to equations of the type $r=e^{\phi/\alpha}$.

26. An auditorium comprising a sound origin position, a plurality of sound reflecting surfaces and a plurality of audience surfaces in isophonic relationship in substantial conformity with the equation $$\Sigma\left\{(1-\mu)\frac{d\omega}{dN}\right\}=f(R)-f(r),$$

the median vertical sections of said audience surfaces being curves conforming substantially to equations of the type $r=e^{\phi/\alpha}$.

27. An auditorium comprising a stage, and a sound origin position, a plurality of sound reflecting surfaces and a plurality of audience surfaces in isophonic relationship in substantion conformity with the equation $$\Sigma\left\{(1-\mu)\frac{d\omega}{dN}\right\}=f(R)-f(r),$$

the sections of said audience surfaces formed by a vertical plane traversing the stage being curves conforming substantially to equations of the type $r=e^{\phi/\alpha}$.

28. An auditorium comprising a stage, and a sound origin position, a plurality of sound reflecting surfaces and a plurality of audience surfaces in isophonic relationship in substantial conformity with the equation $$\Sigma\left\{(1-\mu)\frac{d\omega}{dN}\right\}=f(R)-f(r),$$

a plurality of sections of said audience surfaces formed by a plurality of vertical planes traversing the stage being curves conforming substantially to equations of the type $r=e^{\phi/\alpha}$.

29. An auditorium having a sound origin position, an audience area, and a sound reflecting surface constituting a boundary of said auditorium positioned with respect to said sound origin position and said audience area in accordance with the condition that the sum of direct and reflected sound intensities reaching any given portion of the said audience area shall be not less than a desired minimum.

30. An auditorium having a sound origin position, an audience floor and an audience gallery and sound reflecting boundary surfaces, a portion of said boundary surfaces being formed and placed to reflect sound waves to the audience floor to reenforce sound waves proceeding directly from the origin to said floor, and a portion of said boundary surfaces being formed and placed to reflect sound waves to said gallery to reenforce sound waves proceeding directly from the origin to said gallery, whereby the sum of the sound intensities due to direct and reflected sound waves shall be the same at said audience floor and gallery.

31. In an auditorium, as sound origin region, an audience area, and sound reflecting surfaces so located and shaped with respect to said sound origin region and audience area in accordance with the condition that the sum of the sound intensities of direct and reflected waves reaching all parts of the audience area located more than a critical distance from the sound origin region varies substantially in accordance with a predetermined function of the distance from the sound origin, whereby persons seated at the same distance from the sound origin receive substantially equal sound intensities.

32. In an auditorium, a sound origin region and an audience surface and a sound reflecting surface forming a boundary of said auditorium, said surfaces being shaped and placed with respect to each other and to said sound origin region in accordance with the condition that the intensity of sound received at said audience surface after reflection from said sound reflecting surface when added to the intensity of sound proceeding direct to said audience surface shall not be less than a desired minimum.

33. In an auditorium, a sound origin region and an audience surface and a sound reflecting surface forming a boundary of said auditorium, said surfaces being shaped and placed with respect to each other and to said sound origin region in accordance with the condition that the intensity of sound received at said audience surface after reflection from said sound reflecting surface when added to the intensity of sound proceeding direct to said audience surface shall not be less than a desired minimum, the length of path of the reflected waves reaching any given point in the audience surface not exceeding the length of path of the direct waves reaching said point by more than approximately seventy (70) feet.

34. In an auditorium, a sound origin region and an audience surface and sound reflecting surface, forming a boundary of said auditorium, said surfaces being shaped and placed with respect to each other and to said sound origin region in accordance with the condition that the intensity of sound received at said audience surface after reflection from said sound reflecting surface when added to the intensity of sound proceeding direct to said audience surface shall be substantially constant at all parts of said audience surface more remote from said sound origin position than the critical distance.

35. An auditorium having a sound origin region, an audience surface and a sound reflecting surface forming a boundary of said auditorium, the forms of said audience surface and sound reflecting surface and the relative positions of said sound origin region, audience surface and sound reflecting surface conforming to the condition that the sound intensities received at any given portion of said audience surfaces shall be not less than a desired minimum, at least one of said surfaces conforming in shape to the figure of revolution of a geometrical line revolving about a vertical axis passing through said sound origin region.

36. An auditorium having a sound origin region, an audience surface and a sound reflecting surface forming a boundary of said auditorium, the forms of said audience surface and sound reflecting surface and the relative positions of said sound origin region audience surface and sound reflecting surface conforming to the condition that the sound intensities received at any given portion of said audience surface shall be not less than a desired minimum, each of said surfaces conforming in shape to the figure of revolution of a geometrical line revolving about a vertical axis passing through said sound origin region.

37. An auditorium having a sound origin region, an audience surface and a plurality of sound reflecting surfaces forming a boundary of said auditorium, the forms of said audience surface and sound reflecting surfaces and the relative positions of said sound origin region audience surface and sound reflecting surfaces conforming to the condition that the sound intensities received at any given portion of said audience surface shall be not less than a desired minimum, said sound reflecting surfaces conforming in shape to the figure of revolution of a geometrical line revolving about a vertical axis passing through said sound origin region.

38. An auditorium comprising a sound origin position, a sound reflecting surface and an audience surface in substantial isophonic relationship in conformity with the equation $$\Sigma\left\{(1-\mu)\frac{d\omega}{dN}\right\} = F(r) - f(r)$$

wherein $r$ is the distance from the sound origin.

In testimony whereof I have affixed my signature to this specification.

HEREWARD LESTER COOKE.